United States Patent
Bartholomew et al.

(10) Patent No.: US 6,292,479 B1
(45) Date of Patent: *Sep. 18, 2001

(54) TRANSPORT OF CALLER IDENTIFICATION INFORMATION THROUGH DIVERSE COMMUNICATION NETWORKS

(75) Inventors: Dale L. Bartholomew, Vienna; Robert D. Farris, Sterling, both of VA (US); Stephen J. Flaherty, Upper Marlboro, MD (US)

(73) Assignee: Bell Atlantic Network Services, Inc., Arlington, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/822,602

(22) Filed: Mar. 19, 1997

(51) Int. Cl.[7] ............................... H04L 12/66; H04L 12/28
(52) U.S. Cl. ........................... 370/352; 370/356; 370/401
(58) Field of Search ................................... 370/352, 353, 370/354, 355, 356, 357, 373, 385, 389, 401, 259, 466; 379/93.23, 142, 201, 219

(56) References Cited

U.S. PATENT DOCUMENTS

| 4,652,700 | 3/1987 | Matthews et al. . |
|---|---|---|
| 4,827,500 | 5/1989 | Binkerd et al. . |
| 4,872,160 | 10/1989 | Hemmady et al. . |
| 4,958,341 | 9/1990 | Hemmady et al. . |
| 5,008,926 | 4/1991 | Misholi . |
| 5,012,511 | 4/1991 | Hanle et al. . |
| 5,029,199 | 7/1991 | Jones et al. . |
| 5,193,110 | 3/1993 | Jones et al. . |
| 5,206,901 | 4/1993 | Harlow et al. . |
| 5,208,848 | 5/1993 | Pula et al. . |
| 5,247,571 | 9/1993 | Kay et al. . |
| 5,309,437 | 5/1994 | Perlman et al. . |
| 5,341,374 | 8/1994 | Lewen et al. . |
| 5,375,068 | 12/1994 | Palmer et al. . |
| 5,406,557 | 4/1995 | Baudoin . |
| 5,410,754 | 4/1995 | Klotzbach et al. . |
| 5,430,727 | 7/1995 | Callon . |
| 5,434,913 | 7/1995 | Tung et al. . |

(List continued on next page.)

OTHER PUBLICATIONS

Weisser et al. "The Intelligent Network and Forward–Looking Technology" IEEE COMM Magazine, Dec. 1988, pp. 64–69.

Shah et al. "Application of a New Network Concept for Faster Service Deployment" International Conference on Comm. 88 Jun. 12–15, 1988, IEEE COMM, Soc. Conference, Record vol. 3, pp. 1327–1329.

*Primary Examiner*—Melvin Marcelo
*Assistant Examiner*—Chiho Andrew Lee
(74) *Attorney, Agent, or Firm*—McDermott, Will & Emery

(57) ABSTRACT

A voice call is transported through diverse network paths including a switched telephone network and a wide area data internetwork, for example, the Internet. In routing the call, common channel signalling is used to provide data identifying a calling subscriber line from a calling PSTN, which information can then be transported through the separate data internetwork to the destination PSTN, at which the data is then extracted and sent to the called subscriber line while completing routing of the call. A route for the call is established at gateways connected to the data internetwork at the interface points with the calling and destination PSTNs, calling subscriber line information and dialed digit information being conveyed to the gateways. The destination end gateway initiates a call connection to the calling subscriber line via the destination PSTN to complete routing of the call, while supplying identification of the calling subscriber line in a form recognized as such by the called PSTN. The called party central office can then provide caller ID services.

18 Claims, 6 Drawing Sheets

U.S. PATENT DOCUMENTS

| | | |
|---|---|---|
| 5,490,247 | 2/1996 | Tung et al. . |
| 5,493,568 | 2/1996 | Sampat et al. . |
| 5,608,786 | 3/1997 | Gordon . |
| 5,724,355 | 3/1998 | Bruno et al. . |
| 5,724,412 * | 3/1998 | Srinivasan .......................... 379/93.23 |
| 5,726,984 | 3/1998 | Kubler et al. . |
| 5,838,682 * | 11/1998 | Dekelbaum et al. ................. 370/401 |
| 5,867,562 * | 2/1999 | Scherer ................................... 379/88 |
| 6,069,890 * | 5/2000 | White et al. ......................... 370/352 |

* cited by examiner

TRANSPORT OF CALLER IDENTIFICATION INFORMATION THROUGH DIVERSE COMMUNICATION NETWORKS

RELATED APPLICATIONS

This application is related to application Ser. No. 08/821,027 filed Mar. 19, 1997 and entitled Voice Call Alternative Routing Through PSTN And Internet Networks, application Ser. No. 08/634,544, entitled Universal Access Multimedia Network, filed Apr. 18, 1996, application Ser. No. 08/634,543, entitled Internet Telephone Service, filed Apr. 18, 1996 and application Ser. No. 08/670,908, entitled Internet Telephone System, filed Jun. 28, 1996. The specifications of those applications are incorporated herein by reference in their entirety.

TECHNICAL FIELD

The present invention relates to telecommunications networks and more particularly to the transport of a voice call through diverse network paths including a switched telephone network and a wide area data internetwork, for example, the Internet. The routing set-up for such call includes conveyance of caller identification information to the destination network to enable provision of caller information based enhanced services to subscribers.

BACKGROUND OF THE INVENTION

Implementation of voice telephone service over a worldwide data network, such as the Internet, offers advantages that are now being explored. The Internet basically comprises several large computer networks joined together over high-speed data links ranging from ISDN to T1, T3, FDDI, SONET, SMDS, OT1, etc.

A computer network is simply a collection of autonomous computers connected together to permit sharing of hardware and software resources, and to increase overall reliability. The qualifying term "local area" is usually applied to computer networks in which the computers are located in a single building or in nearby buildings, such as on a college campus or at a single corporate site. When the computers are further apart, the terms "wide area network" or "long haul network" are used, but the distinction is one of degree and the definitions sometimes overlap.

A bridge is a device that is connected to at least two LANs and serves to pass message frames or packets between LANs, such that a source station on one LAN can transmit data to a destination station on another LAN, without concern for the location of the destination. Bridges are useful and necessary network components, principally because the total number of stations on a single LAN is limited. Bridges can be implemented to operate at a selected layer of protocol of the network.

In operation, computer networks are governed by protocols, i.e., sets of conventions or rules that govern the transfer of data between computer devices. The simplest protocols define only a hardware configuration, while more complex protocols define timing, data formats, error detection and correction techniques, and software structures. Protocols generally are employed in multiple layers. A low-level physical layer protocol assures the transmission and reception of a data stream between two devices. Data packets are constructed in a data link layer. Over the physical layer, a network and transport layer protocol governs transmission of data through the network, thereby ensuring end-to-end reliable data delivery.

The Internet is a collection of networks, including Arpanet, NSFnet, regional networks such as NYsernet, local networks at a number of university and research institutions, and a number of military networks. TCP/IP protocols provide a set of services that permit users to communicate with each other across the entire Internet. The specific services that these protocols provide include file transfer, remote log-in, remote execution, remote printing, computer mail, and access to network file systems.

The basic function of the Transmission Control Protocol (TCP) is to ensure that commands and messages from an application protocol, such as computer mail, are sent to their desired destinations. TCP provides for keeping track of what is sent, and for retransmitting anything that does not get to its destination correctly. If any message is too long to be sent as one "datagram," it will be split into multiple datagrams and TCP protocol ensures that they all arrive correctly and are reassembled for the application program at the receiving end. Since these functions are needed for many applications, they are collected into a separate protocol (TCP) rather than being part of each application.

The Internet Protocol (IP) provides a basic service to TCP: delivering datagrams to their destinations. TCP in effect hands IP a datagram with an intended destination; IP is unaware of any relationship between successive datagrams, and merely handles routing of each datagram to its destination. If the destination is a station connected to a different LAN, the IP makes use of routers to forward the message.

TCP/IP operates as a five layer protocol, the five layers generally described as follows:

Layer 5—The Application Layer. Applications such as ftp, telnet, SMTP, and NFS relate to this layer.

Layer 4—The Transport Layer. In this layer, TCP and UDP add transport data to the packet and pass it to layer 3.

Layer 3—The Internet Layer. When an action is initiated on a local host (or initiating host) that is to be performed or responded to on a remote host (or receiving host), this layer takes the package from layer 4 and adds IP information before passing it to layer 2.

Layer 2—The Network Interface Layer. This is the network device as the host, or local computer, sees it and it is through this medium that the data is passed to layer 1.

Layer 1—The Physical Layer. This is literally the Ethernet or Serial Line Interface Protocol (SLIP) itself.

At the receiving host the layers are stripped one at a time, and their information is passed to the next highest level until it again reaches the application level. If a gateway exists between the initiating and receiving hosts, the gateway takes the packet from the physical layer, passes it through a data link to the IP physical layer to continue. As a message is sent from the first host to the second, gateways pass the packet along by stripping off lower layers, readdressing the lower layer, and then passing the packet toward its final destination.

A router, like a bridge, is a device connected to two or more LANs. Unlike a bridge, however, a router operates at the network layer level, instead of the data link layer level. Addressing at the network layer level may make use of a 32-bit address field for each host, and the address field includes a unique network identifier and a host identifier within the network. Routers make use of the destination network identifier in a message to determine an optimum path from the source network to the destination network. Various routing algorithms may be used by routers to determine the optimum paths. Typically, routers exchange information about the identities of the networks to which they are connected.

When a message reaches its destination network, a data link layer address is needed to complete forwarding to the destination host. Data link layer addresses are 48 bits long and are globally unique, i.e., no two hosts, wherever located, have the same data link layer address. A protocol called ARP (address resolution protocol) obtains a data link layer address from the corresponding network layer address (the address that IP uses). Typically, each router maintains a database table from which it can look up the data link layer address, but if a destination host is not in this ARP database, the router can transmit an ARP request throughout the network that asks a host having the network layer address to supply its data link layer address in a return message. only the addressed destination host responds, and the router is then able to insert the correct data link layer address into the message being forwarded, and to transmit the message to its final destination.

IP routing specifies that IP datagrams travel through internetworks one hop at a time (next hop routing) based on the destination address in the IP header. The entire route is not known at the outset of the journey. Instead, at each stop, the next destination (or next hop) is calculated by matching the destination address within the datagram's IP header with an entry in the current node's (typically but not always a router) routing table.

Each node's involvement in the routing process consists only of forwarding packets based on internal information resident in the router, regardless of whether the packets get to their final destination. IP routing does not alter the original datagram; the datagram source and destination addresses remain unaltered. The IP header always specifies the IP address of the original source and the IP address of the ultimate destination.

When IP executes the routing algorithm it computes a new address, the IP address of the machine/router to which the datagram should be sent next. This algorithm uses the information from the routing table entries, as well as any cached information local to the router. This new address is most likely the address of another router/gateway. If the datagram can be delivered directly (the destination network is directly attached to the current host) the new address will be the same as the destination address in the IP header. Reference is made to the above identified copending patent application Ser. No. 08/753,198 filed Nov. 21, 1996 for a further detailed description of routers with respect to IP protocol functionality.

A simplified diagram of the Internet is depicted in FIG. 1. The Internet 50 comprises Autonomous Systems (AS) which may be owned and operated by Internet Service Providers (ISPs) such as PSI, UUNET, MCI, SPRINT, etc. Three such AS/ISPs are shown in FIG. 1 at 52, 54 and 56. The Autonomous Systems (ASs) are linked by Inter-AS Connections 58, 60 and 62. Information Providers (IPs) 64 and 66, such as America Online (AOL) and Compuserve, are connected to the Internet via high speed lines 68 and 70, such as T1/T3 and the like. Information Providers generally do not have their own Internet based Autonomous Systems but have or use Dial-Up Networks such as SprintNet (X.25), DATAPAC and TYMNET.

By way of current illustration, MCI is both an ISP and an IP, Sprint is an ISP, and MicroSoft (MSN) is an IP using UUNET as an ISP. Other information providers, such as universities, are indicated in exemplary fashion at 72 and are connected to the AS/ISPs via the same type connections, here illustrated as T1 lines 74. Corporate Local Area Networks (LANs), such as those illustrated at 76 and 78, are connected through routers 80 and 82 and links shown as T1 lines 84 and 86. Laptop or PC computers 88 and 90 are representative of computers connected to the Internet via the public switched telephone network (PSTN), shown connected to the AS/ISPs via dial up links 92 and 96.

The Information Providers (IPs) are end systems that collect and market the information through their own servers. Access providers are companies such as UUNET, PSI, MCI and SPRINT which transport the information. Such companies market the usage of their networks.

Thus, in simplified fashion the Internet may be viewed as a series of gateway routers connected together with computers connected to the routers. In the addressing scheme of the Internet an address comprises four numbers separated by dots. An example would be 164.109.211.237. Each machine on the Internet has a unique number that includes one of these four numbers. In the address, the leftmost number is the highest number. By analogy this would correspond to the ZIP code in a mailing address. The first two numbers that constitute this portion of the address may indicate a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This process continues until the packet arrives at the destination computer. The separate packets that constitute a message may not travel the same path, depending on traffic load. However, they all reach the same destination and are assembled in their original sequence order in a connectionless fashion. This is in contrast to connection oriented modes such as frame relay and ATM or voice.

Connection-oriented network services require that users establish a single distinct virtual circuit before the data can be transmitted. This circuit then defines a fixed path through the network that all traffic follows during the session. Several packet switching services are connection-oriented, notably X.25 and Frame Relay. X.25 is the slower of the services, but has built-in error correction—enough for its performance not to depend on clean, high-quality optical fiber lines. Frame relay, regarded as the first generation of fast packet technology, is well-suited for high-speed bursty data communication applications.

Connectionless network services, by contrast, let each packet of a communications session take a different, independent path through the network. One example is the Switched Multimegabit Data Service (SMDS), a possible precursor to broadband ISDN. This fast-packet service supports data rates ranging from the T1 rate of 1.544 Mb/s up to 1 Gb/s. The SMDS transport system architecture is defined by IEEE 802.6 Metropolitan Area Network standards.

Software has recently been developed for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers. The book "Mastering the Internet", Glee Cady and Pat McGregor, SYBEX Inc., Alameda, Calif., 1994, ISBN 94-69309, very briefly describes three proprietary programs said to provide real-time video and voice communications via the Internet.

The commonly assigned applications, Ser. Nos. 08/634, 543 and 08/670,908, identified more particularly above, are concerned with providing telephone service via the Internet to users of the public telecommunications network who may not have access to a computer or separate telephone access to the Internet. Such service would be economical, especially for long distance calls, compared with the toll rates charged by long distance interexchange carriers.

The routing of real time voice telephone calls through a wide area data internetwork, such as the Internet, presents challenges to telephone company service providers with respect to providing all of the enhanced services that are currently available for calls that are routed entirely through the traditional public switched telephone network. One group of such services is based in the use of calling party identification.

For example, the caller ID service, with its various enhancements, is a telephone on-hook capability that provides a called party with information about the caller before the incoming call is answered. Conventionally, such information includes the date and time of the call and the caller's telephone number. Expanded versions provide additional information. A data message, preceded by a channel seizure signal, is sent in conjunction with the ringing signal from the central office to the called party during the silent interval after the first 20-Hz, 2-second ringing phase. To perform these functions, the central office must have available the calling party information.

Other services involve various subscriber options to a called party who has not answered a call by reason, for example, of the line being in a busy condition at the time of the call or there being no answer by the called party. By later dialing a particular code of DTMF keys, a party at the called subscriber line station may obtain the identity of the last caller or may have the number of the last caller automatically dialed (known as "return call"). These services also require that the calling party identification information for the last call be available to the central office. The term "caller ID services," as used hereinafter throughout this disclosure is intended to refer to these various services, briefly described above.

A problem with earlier proposed voice Internet service systems is the inability to provide the destination public switched telephone network the appropriate caller identification information inasmuch as calls are routed from an external network to the destination public switched telephone network. With current implementations, a gateway router, i.e., the node in the Internet that initiates connection of a call to the destination PSTN, would be identified as the calling party source. Caller information identification services would not provide actual caller information under these conditions; instead, the called party would be subject to receiving useless information. In the return call service example, dialing of the appropriate code would result in a call placed to the gateway router as a final destination. The purpose of return call, of course, is to establish connection to the last caller, by whatever communication path, not necessarily to establish connection with the Internet.

BRIEF SUMMARY OF THE INVENTION

The present invention overcomes the above noted drawbacks of earlier proposed systems and provides additional advantages in part by providing the actual directory number of a calling party in the information conveyed throughout the course of set up of a voice call through a data network.

An advantage of the present invention is the use, in routing a voice call, of common channel signalling to provide data identifying a calling subscriber line from a calling PSTN, which information can then be transorted through a separate data internetwork to the destination PSTN, at which the data is then extracted and sent to the called subscriber line while completing routing of the call. A route for the call is established at gateways connected to the data internetwork at the interface points with the calling and destination PSTNs, calling subscriber line information and dialed digit information being conveyed to the gateways. The destination end gateway initiates a call connection to the called subscriber line via the destination PSTN to complete routing of the call, while supplying identification of the calling subscriber line in a form recognized as such by the called PSTN. The called party central office can then provide caller ID services.

A further advantage of the present invention is the use of a gateway server connectable to the data internetwork to interface with the destination PSTN through a connection recognizable by the PSTN. Calling party identification conveyed through this connection can be distinguished by the receiving PSTN from data identifying the gateway.

Additional advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings, throughout the various figures of which like elements are depicted by the same reference numerals, and description are to be regarded as illustrative in nature, and not as restrictive.

DETAILED DESCRIPTION OF THE INVENTION

Figure 1:
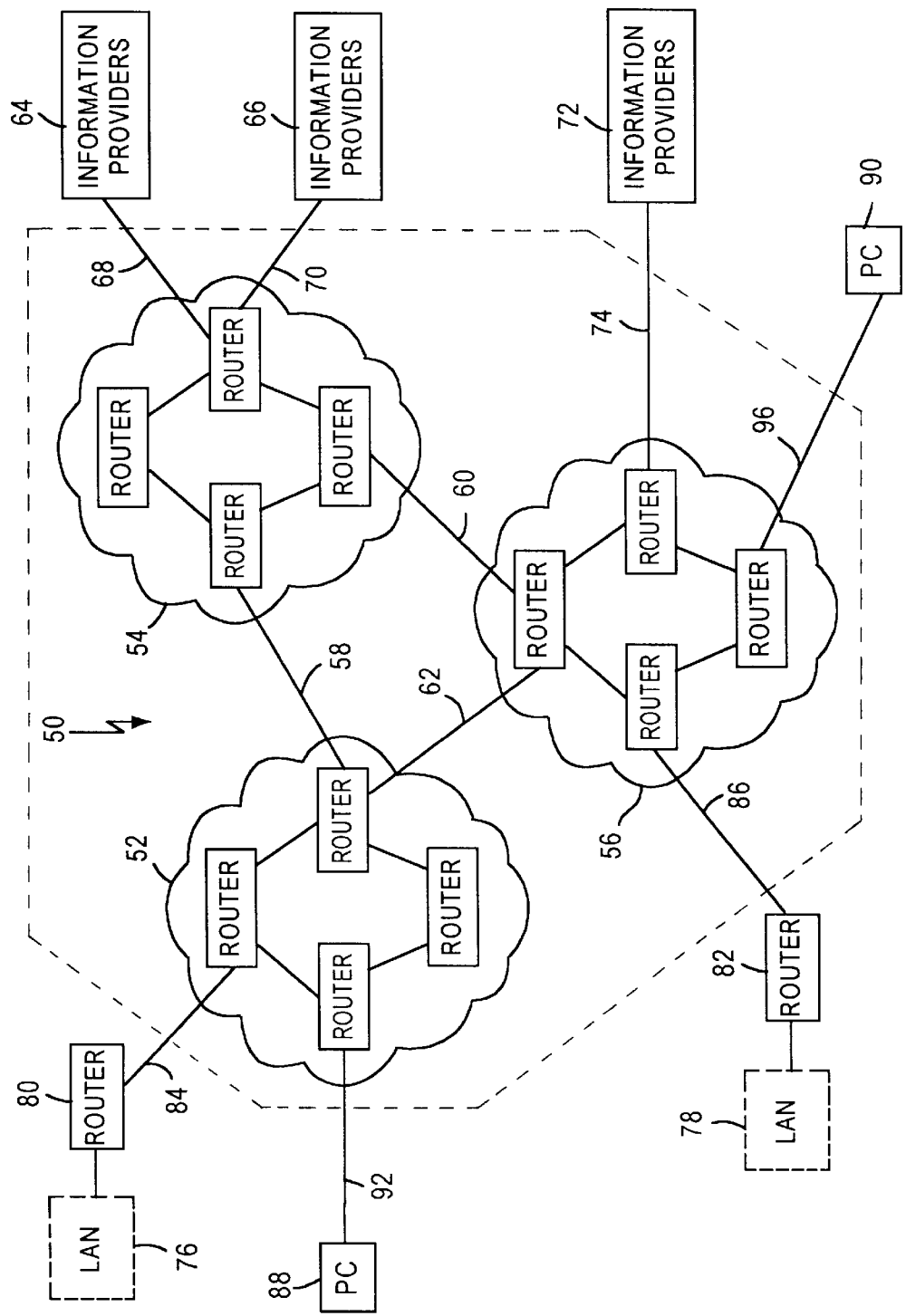
FIG. 1 is a simplified diagram of the Internet.
Figure 2:
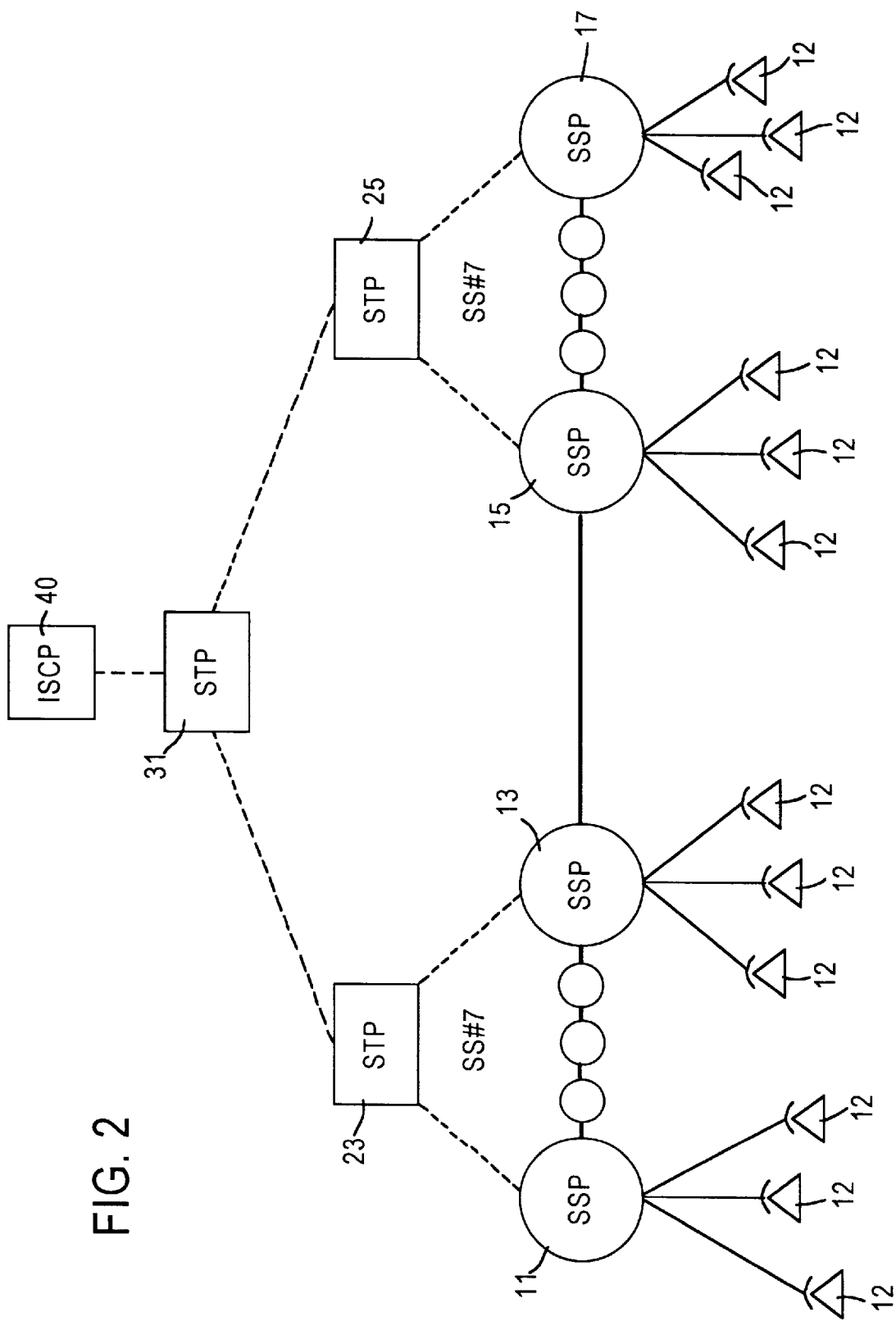
FIG. 2 is a simplified block diagram of a Public Switched Telephone Network (PSTN) that comprises a Common Channel Interoffice Signaling (CCIS) system and voice communication network that perform as an Advanced Intelligent Network (AIN) system.

FIG. 2 is a depiction of the architectural environment of a switched telephone network that is considerably simplified for explanation purposes. The full network and operating environment for a PSTN comprises multiple central offices, diverse interconnections, and provisions for reliability through redundancy, all of which need not be shown for developing an understanding of the invention. Service Switching Points (SSPs) 11, 13, 15, 17 represent central office (CO) switching systems that are appropriately equipped programmable switches present in the telephone network. Subscriber lines individually connect SSPs to subscriber premises at which locations telephones 12 or other communication devices are connected. In the well known Advanced Intelligent Network (AIN), the SSPs recognize AIN type calls, launch queries to the ISCP and receive commands and data from the ISCP to further process the AIN calls. In the illustrated embodiment, the CO-SSPs are end offices.

SSP capable central office switching systems typically contain a programmable digital switch with CCIS communications capabilities. One example of an SSP capable CO switch is a 5ESS type switch manufactured by AT&T. Other vendors, such as Northern Telecom and Seimens, manufacture comparable digital switches that may serve as the SSPs. A more detailed description of an exemplary SSP type CO is presented in the commonly assigned copending application, Ser. No. 08/248,980, filed May 25, 1994, hereby incorporated by reference herein.

The SSP type COs 11 and 13 are shown connected to a first local area STP 23, SSP-COs 15 and 17 being connected to a second local area STP 25. The connections to the STPs are for signalling purposes. The control part of SS7 protocol is known as Integrated Services Digital Network User Part (ISUP). ISUP determines the procedures for setting up, coordinating, and taking down trunk calls on the SS7 network.

Signaling between switching offices is required for transmitting routing and destination information, for transmitting alerting messages such as to indicate the arrival of an incoming call, and for transmitting supervisor information, e.g. relating to line status. Signaling between offices can use 'in-band' transport or 'out-of-band' transport.

In-band signaling utilizes the same channel that carries the communications of the parties. In a voice telephone system, for example, one of the common forms of in-band signaling between offices utilizes multi-frequency signaling over voice trunk circuits. The same voice trunk circuits also carry the actual voice traffic between switching offices. In-band signaling, however, tends to be relatively slow and ties up full voice channels during the signaling operations. In telephone call processing, a substantial percentage of all calls go unanswered because the destination station is busy. For in-band signaling, the trunk to the end office switching system serving the destination is set-up and maintained for the duration of signaling until that office informs the originating office of the busy line condition. Thus, in-band signaling greatly increases congestion on the voice traffic channels. In-band signaling also is highly susceptible to fraud by hackers who have developed devices that mimic in-band signaling.

Out-of-band signaling has evolved to mitigate the above-described problems. Out-of-band signaling utilizes separate channels, and in many cases separate switching elements. Congestion on the channels carrying the actual communication traffic is thereby considerably reduced. Unauthorized simulation of signaling messages which ride on an out-of-band channel or network is virtually impossible. As out-of-band signaling utilizes its own signal formats and protocols, unconstrained by protocols and formats used for the actual communication, out-of-band signaling typically is considerably faster than in-band signaling.

Out-of-band signaling networks typically include data links and one or more packet switching systems. Out-of-band signaling for telephone networks is often referred to as Common Channel Signaling (CCS) or Common Channel Interoffice Signaling (CCIS). Most such signaling communications for telephone networks utilize signaling system 7 (SS7) protocol. An SS7 compliant CCIS network, such as illustrated in FIG. 2, comprises data Signal Transfer Points (STPs) and data links between the STPs and various telephone switching offices of the network. The STPs are program controlled packet data switching systems. In normal call processing operation, an STP will receive a packet data message from another node of the network, for example from an end office switching system. The STP analyzes point code information in the packet and routes the packet according to a translation table stored within the STP. This translation table is static. Any packet having a particular point code is output on a port going to the next CCIS signaling node specified by translation of that point code. For a more detailed description of the makeup of SS7 messages and their specific component purposes, reference is made to commonly assigned copending application Ser. No. 08/753, 198 filed Nov. 21, 1996, identified above.

Each local area STP can connect to a large number of the SSP-COs, as indicated for ease of illustration merely by the circles below STPs 23 and 25. The central office SSPs are interconnected to each other by trunk circuits for carrying telephone services. The overall network may contain end offices without SSP functionality. Such end offices will forward calls to one of the SSPs if such treatment is required. Also, certain switching offices within the network, whether SSPs or not, may function primarily as tandem type offices providing connections between trunk circuits only.

The local area STPs 23 and 25, and any number of other such local area STPs (not shown) communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches. Also, certain switching offices within the network, whether SSPs or not, may function primarily as tandem type offices providing connections between trunk circuits only. The links between the central office switching systems and the local area STPs 23 and 25 are typically SS#7 type CCIS interoffice data communication channels. The local area STPs are in turn connected to each other and to the regional STP 31 via a packet switched network. The regional STP 31 also communicates with the ISCP 40 via a packet switched network.

The network shown in FIG. 2, for purposes of explanation of the present invention, may be considered to be one PSTN or a combination of a plurality of PSTNs, depending upon the extent of the geographical area serviced. The networks shown may serve different regions of the country and be operated by different local exchange carriers. Alternatively, one network may be a local exchange carrier network, and another network may comprise an interexchange carrier network.

Figure 3:
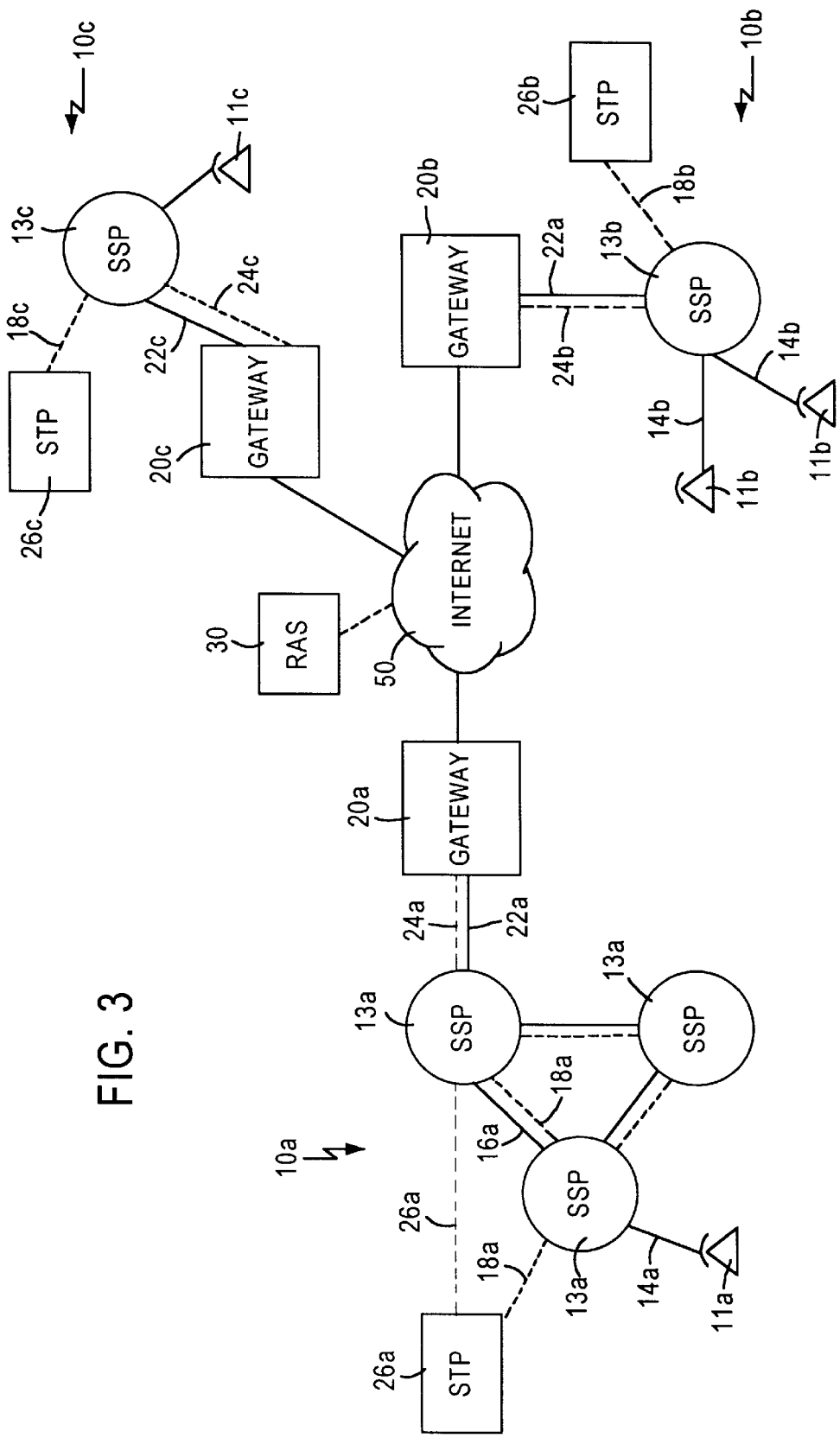
FIG. 3 is a simplified block diagram illustrating the architecture of a telecommunications system using a wide area packet switched network such as the Internet, in combination with a plurality of PSTNs as used in the present invention.

FIG. 3 is a block diagram illustrating the architecture of a telecommunications system using a wide area packet switched network such as the Internet, in combination with a plurality of PSTNs as used in the present invention. PSTNs 10a, 10b, and 10c may be considered to be operating in different geographical regions. For example, each network may be a public switched telephone network such as a Regional Bell Operating Company (REOC), or a private communication network having a limited service area. Each network has at least one assigned number code, such as an area code, that uniquely identifies service areas of that network. Each network also includes a plurality of interconnected switching systems 13 serving customer premises terminals 11 via local loop connections 14. Each network 10 also includes trunk lines 16 and signaling lines 18 that support the interoffice signaling for the particular network.

Each telephone system also includes a gateway 20 that functions as an Internet telephony server, providing an interface between the corresponding telephone system 10 and the Internet. It is to be understood that the use of the terms Internet and data internetwork and the like are all used interchangeably herein to denote a wide area packet switched network that may comprise interconnected subnetworks. Similarly the term "gateway" may be variously described as an Internet module or interface, gateway server, or gateway router. The gateway 20 is typically connected to a local central office 13 via a standard voice grade line or trunk connection 22, for example a T-1 or T-3 connection. Alternatively the hardware associated with the gateway 20 may be situated at the central office 13 and associated with the switching system.

The gateways 20 include signaling capabilities, for example SSP capabilities, and are connected into the CCIS network as indicated by the links 24 to the illustrative STP 26. The SSPs serving the corresponding gateway 20 are inter-connected with the central office SSPs and CCIS network. The gateways may be linked to the networks for signaling purposes by conventional F links. As an alternative to the illustrated arrangement, the gateways may be directly linked to the STPs. The gateways are connected to the Internet by T1/T3 trunks 26.

A routing and administration server (RAS) 30, linked to the Internet, includes a routing and administration database for managing call routing translations and user access permissions. The RAS 30 is shown as an Internet node having a dedicated virtual path 32. The routing and administration database stores records for every area code/NNX served by a telephony system 10, along with the network address for the corresponding gateway 20.

Figure 4:
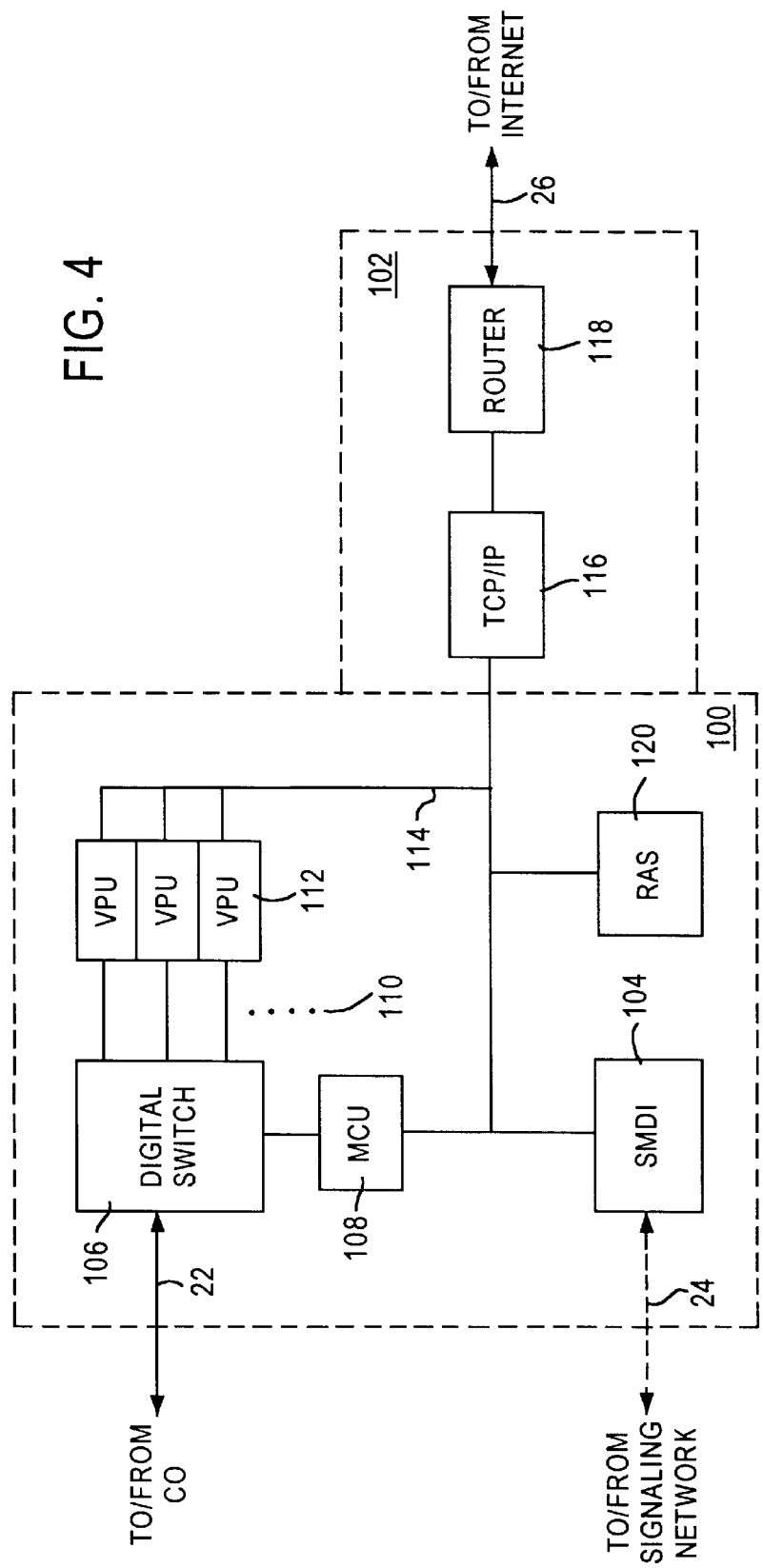
FIG. 4 is a block diagram of a preferred embodiment of a gateway 20 of FIG. 3.

FIG. 4 is a block diagram of a preferred embodiment of a gateway 20 of FIG. 3. The gateway comprises a telephony platform 100 and an Internet server platform 102. The telephony platform 100 performs basic telephony functions, including incoming call detection (ringing, trunk seizure, etc.), call supervision/progress detection (busy tone, disconnect, connect, recorded announcement, dialtone, speech, etc.), call origination, DTMF, call termination, call disconnect, switch hook flash, etc.

The telephony platform includes a simplified message desk interface (SMDI) 104 that sends and receives signaling data to the CCS signaling network, a digital switch 106 that sends and receives communication traffic from the trunk line 22, a master control unit (MCU) 108 that controls the overall operations of the gateway, including controlling the switch 106 to separate data traffic on the trunk line 26 into single 64 kb/s data channels 110. The data on each of the data channels 110 is compressed by a voice processor unit (VPU) 112 into compressed communication data having a data rate of approximately 16 kbit/s or lower. The compressed communication data may be either voice data or other data, for example facsimile data.

The compressed communication data is output to a local area network (LAN) 114, for example an Ethernet-based network at 100 Mbit/s. The LAN 114 carries data signals between the MCU 108 and the voice processing units 112. The system also includes T1 type digitized audio links 110 between the switch 106 and each of the VPU's 112. The LAN 114 transports data packets to a packet assembler/disassembler (PAD) 116 that packetizes data on the LAN 114 into TCP/IP packets for transport onto the Internet. The PAD 116 also recovers signaling and communication data from data packets received by the router 118. Hence, the PAD 116 receives signaling information from the SMDI 104 originated from the signaling network, and outputs signaling data recovered from data packets received from the Internet to the SMDI 104 for subsequent call processing via the signaling links 24.

The gateway also may include an RAS database 120 that is an image of the database in the RAS server 30. The RAS database 120 enables translation information to be obtained without accessing the RAS 30 via the Internet. In this arrangement, the gateway would monitor its own bandwidth allocation as stored in the RAS database 120. The router 118 is of the type now generally used in Internet practice. Although not shown for purposes of explanation of the present invention, the router 118 may also be connected to a Domain Name Service (DNS) server and a Dynamic Host Configuration Protocol (DHCP) server of the type conventionally used by Internet Service Providers in existing Internet Service.

Figure 5A:
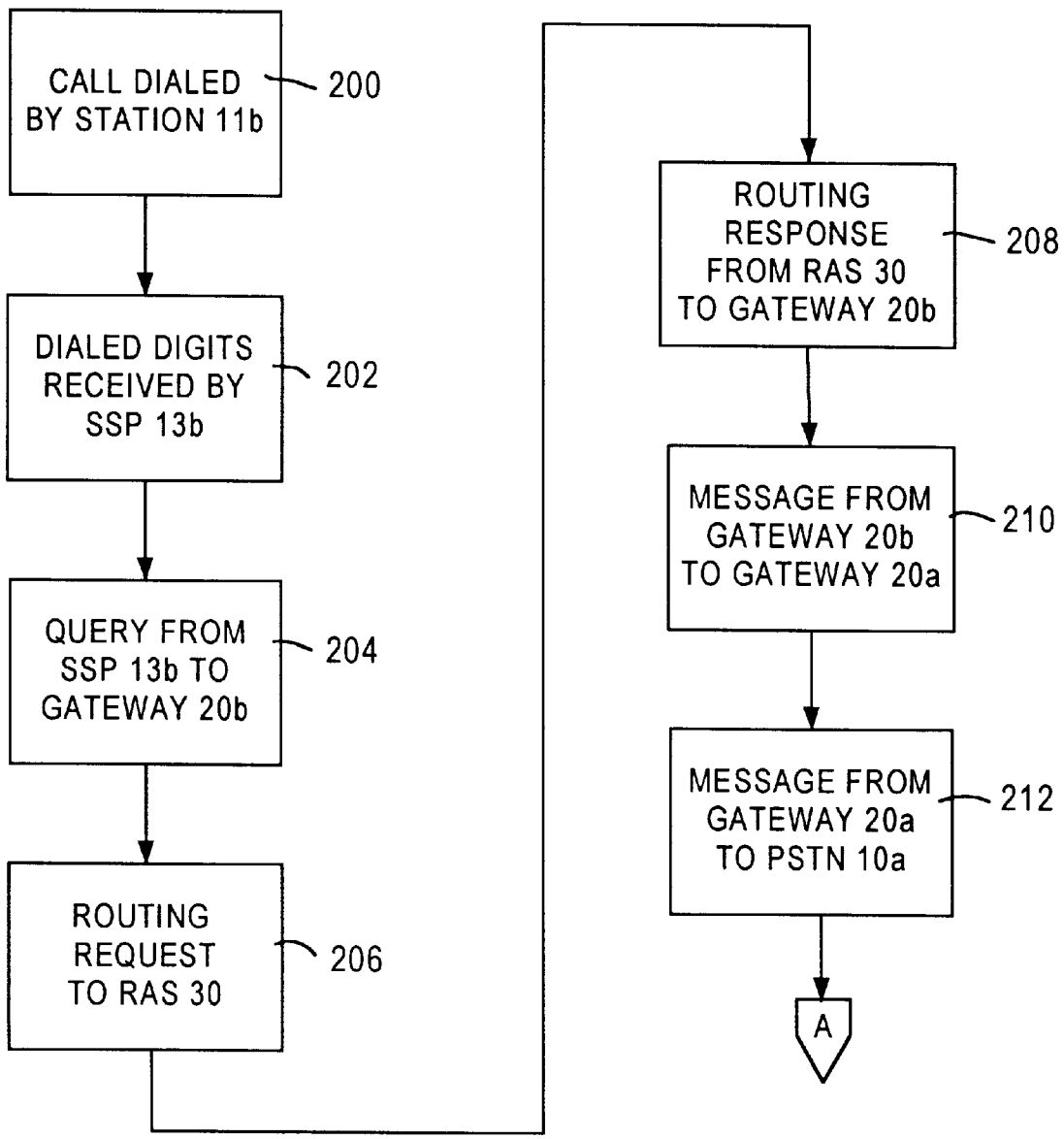
FIGS. 5a and 5b, taken together, form a flow diagram exemplifying processing of a call routed through the architecture illustrated in FIGS. 3 and 4 according to the present invention.
Figure 5B:
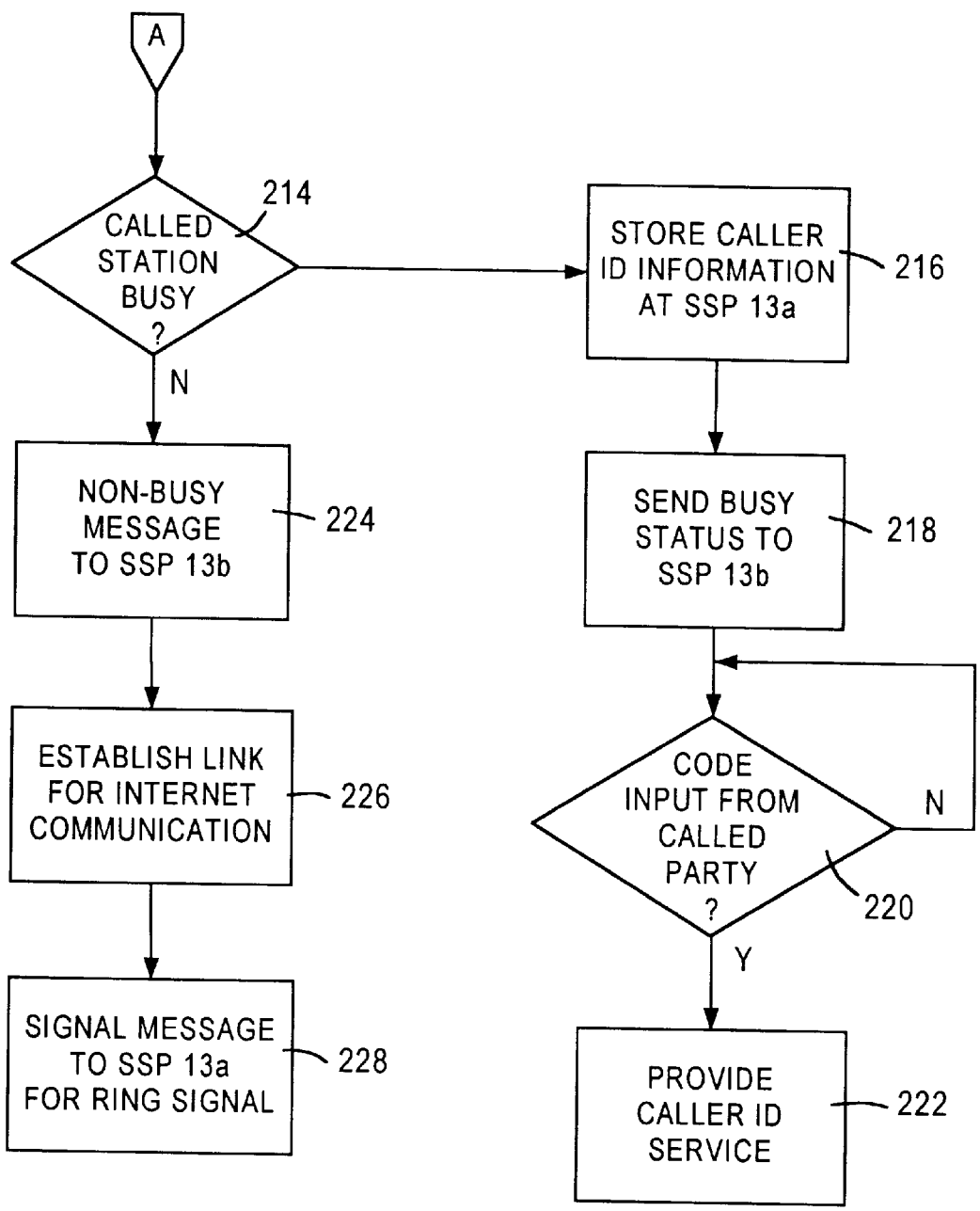

FIGS. 5a and 5b, taken together, form a flow diagram exemplifying processing of a call routed through the architecture illustrated in FIGS. 3 and 4 according to the present invention. In this example a calling party at a station 11b, served by PSTN 10b, is assumed to put the telephone off hook to place the call to a called party at station 11a, served by PSTN 10a, at step 200. The caller may indicate a request for an "Internet call" by dialing a code *82, which prefix has been predesignated by a program at the PSTN central office for this purpose. The dialing of the prefix *82 is followed by the dialing of the directory number of the called party station, including the area code. It is to be recognized that Internet calls may also be initiated in other ways, such as under control of the AIN network. For example, the ISCP would determine whether a call is to be routed through the Internet in response to a trigger from the originating central office to access stored criteria for the calling party in an associated CPR in the ISCP.

In the current example, the central office switching system responds to the off-hook and receives the dialed digits from the calling station in step 202. The central office switching system analyzes the received digits and determines from the prefix *82 that the call is an Internet call. Responsive to its programmed recognition of the prefix code, the originating central office 13b suspends the call and sends a CCIS query message in step 204 to the gateway 20b via the signaling channel 24b.

In response to the query message, the gateway 20b identifies the Internet telephony server (gateway 20a) servicing the called party 11a by sending, in step 206, a routing request, including the number of the calling party 11b and the area code of the called party 11a, to the RAS 30 via the Internet. Alternatively, the gateway 20b may access its own internal routing and administration database 120. The RAS data base accesses its internal translation tables and sends a routing response in step 208. The routing response includes the identity (e.g., IP address) of the gateway 20a serving the called party 11a, the predetermined virtual path between the two servers, and any other pertinent information, such as the minimum guaranteed service level for the calling station 11b. The gateway 20b then sends, in step 210, a signaling message through the Internet in the form of a query message packetized in TCP/IP packets having the IP address of the gateway 20a as the destination address. The signaling packets, which include a session ID, the called number, and the directory number of the calling station 11b, are received by the gateway 20a.

At step 212, the gateway 20a recovers the query message from the payload of the TCP/IP packets and formulates an SS7 signaling message, to be conveyed through the common channel signaling network of PSTN 10a, to set up completion of the call routing to station 11a. Station 11a in this example is shown to be a subscriber of a central office SSP 13a that is not directly connected to the gateway 20a. Routing of the call through PSTN 10a is set up through STP 26a in the common channel signaling network. If the called station instead were to have been a subscriber of the central office to which the gateway is directly connected, signaling through the STP is, of course, unnecessary. In either case, the initial SSP in the PSTN that receives the signaling message extracts caller identification information.

In the absence of provision to the contrary, as in the present invention, an originating switching office normally identifies calling party data by correlating the subscriber line connection at the switch with stored information associated with the subscriber. This data is sent in the SS7 signaling message to the terminating switching office (which may also be the originating switching office). The terminating switching office is then enabled to provide caller ID based services to the called party subscriber. In the Internet call architecture shown in FIG. 3, the voice path of the incoming call between PSTN 10a is connection 22a to digital switch 106 in gateway 20a, while the messaging signal path 24a connects the PSTN with SMDI 104 in the gateway. With conventional call processing methods, the receiving SSP 13a either would misinterpret the identity of the calling party to be the gateway or be unable to provide caller ID information.

To overcome this problem with the prior art, in the present invention SSP 13a is programmed to recognize the voice path connection 22a as a special status condition upon receipt of a signaling message associated with that connection. To obtain originating caller identification information, the switch looks to the message data content of incoming signaling packets for the gateway connection 22a instead of the header address portion of received packets. Signaling messages received at switch ports connected to PSTN locations would be identified by the switch as to caller origination in the conventional manner.

In accordance with the present invention, as an alternative to the arrangement shown in FIG. 3, connections between the gateway 20a and SSP 13a may be replaced by an ISDN connection. With an ISDN link, a separate channel for signaling purposes would be provided. As a further alternative, particularly for PSTN systems that do not include a CCIS network, a feature group D trunk can be connected between the gateway and the SSP. Feature group D protocol provides in-band signaling. In all of these alternatives of the invention, the switch at the incoming SSP is programmed to obtain the originating caller identification information by recognizing the connection to the gateway to extract the appropriate data from the signaling messages.

At step 214, the SSP 13a in PSTN 10a connected to the gateway initiates SS7 signaling to determine whether called station 11a is busy. If the called station is busy, the destination central office SSP 13a so informs the gateway via the CCIS signaling network, while temporarily storing the caller ID information. This information is available for later use in caller ID services such as return call or last caller identification. The busy status is sent in a signaling message back through the Internet to gateway 20b, whereupon a busy signal is provided by PSTN 10b to the calling station 11b in conventional manner. At step 220, determination is made of whether the called station has entered an appropriate code for such services. If so, the corresponding service is provided in conventional manner at step 222.

If the called station is not busy, the destination SSP 13a busies out the called station line 14a by blocking all calls. A signaling message is then sent, via the CCIS network in PSTN 10a, the gateways 20a and 20b and the Internet, to the CCIS network in PSTN 20b to indicate that the called line is available and waiting, at step 224. At step 226, an Internet communication path is established for the call in the manner described more fully in copending application Ser. No. 08/753,198 filed Nov. 21, 1996, identified previously. At step 228, a signaling message is sent through the common channel signaling network of PSTN 10a to the terminating SSP 13a to complete the call routing and ring the called station 11a. The caller ID information obtained from the message is used to provide the caller ID service information between ring signals in the conventional manner.

Only the preferred embodiments of the invention and but a few examples of its versatility are shown and described in the present disclosure. It is to be understood that the invention is capable of use in various other combinations and environments and is capable of changes or modifications within the scope of the inventive concept as expressed herein.

We claim:

1. A communications system comprising:
    a first public switched telephone network (PSTN) including a plurality of subscriber lines and central office switching systems each subscriber line connected to a respective central office switching system and having an assigned directory number, a voice network portion comprising voice communication paths for connection to the subscriber lines, and a common channel signaling network portion comprising signaling paths interconnecting said central office switching systems through at least one signal transfer point;
    a second PSTN, remote from the first PSTN, and including a plurality of subscriber lines and central office switching systems, each subscriber line connected to a respective central office switching system and having an assigned directory number, a voice network portion comprising voice communication paths for connection to the subscriber lines, and a common channel signaling network portion comprising signaling paths interconnecting said central office switching systems through at least one signal transfer point;
    a public wide area internetwork connecting spaced dissimilar networks and using transmission control protocols/internet program (TCP/IP) to link said dissimilar networks; and
    first and second interfaces linking said first PSTN and said second PSTN respectively to said public wide area internetwork to establish a transport path for a voice call from a calling subscriber line of said first PSTN to a called subscriber line at said second PSTN, each of said interfaces comprising a controller controlling the set-up of connections between said calling subscriber line and said called subscriber line via said common channel signaling networks in the respective PSTNs;

wherein said controller in the interface linking the first PSTN provides calling subscriber line identification information from the common channel signaling network of said first PSTN, through said public wide area internetwork to the controller of said second PSTN during set-up of the call for identifying the calling subscriber to the called subscriber.

2. A method for providing caller identification information for a voice call dialed from a subscriber line that traverses a plurality of diverse transport paths including at least a first public switched telephone network (PSTN) to which a called subscriber line is connected, the Internet, and a second PSTN to which the calling subscriber line is connected, said method comprising the steps of:

establishing a route for said call through said second PSTN to a first gateway connected to the Internet, said establishing step comprising conveying calling subscriber line information and dialed digit information to said first gateway;

routing said call through the Internet from said first gateway to a second gateway that interfaces with said first PSTN;

transporting the conveyed information to said second gateway;

initiating a call connection by said second gateway to said called subscriber line via said first PSTN for completion of routing of said call; and supplying identification of said calling subscriber line, obtained through the Internet in said routing step to said called subscriber line upon completion of the routing of said call.

3. A method as recited in claim 2, wherein said supplying step occurs while the called subscriber line is in an on-hook state, whereby a party at the called station may identify the calling party before answering the call.

4. Apparatus for use in a telecommunications system having a plurality of diverse paths for transporting a voice call, said paths traversing at least a first public switched telephone network (PSTN) having a local line to a subscriber receiving the voice call, the Internet, and a second PSTN having a local line to a subscriber placing the voice call, said apparatus comprising:

a server connectable to the Internet for interfacing with said first PSTN said server comprising a connection to said first PSTN and means for providing information to said first PSTN that identifies said calling subscriber line;

whereby calling party identification information, received through the Internet path, is conveyed to the called subscriber line by said first PSTN upon routing of said voice call.

5. Apparatus as recited in claim 4, wherein said first PSTN comprises a switching system to which said connection is coupled, said connection being recognizable by said switching system to enable extraction of calling subscriber line identification information from said means by said switching system.

6. Apparatus as recited in claim 5, wherein said connection is an ISDN connection.

7. Apparatus as recited in claim 5, wherein said connection is a Feature Group connection.

8. A method for providing caller identification information for a voice call, originating from a remote calling telephone subscriber line, to a called telephone subscriber line comprising the steps of:

routing an initial voice call, originated by a calling party at said remote calling telephone subscriber line location and dialed to said called telephone number, through the Internet to a gateway router that interfaces between the Internet and a public switched telephone network (PSTN);

in response to said routing step, placing a subsequent call from said gateway router through the PSTN to said called subscriber line;

linking said initial voice call at said gateway router with said subsequent call, and transporting the originating calling telephone subscriber line identification information from said gateway through said PSIN to said called subscriber line while said called subscriber line is in an on-hook condition.

9. A method for routing a voice call connection between a calling station having a subscriber line in a first PSTN through an Internet link to a called station having a subscriber line in a second PSTN, comprising the steps of:

formulating in the first PSTN a routing message in common channel signaling format, the routing message including data identifying the calling subscriber line;

transporting the routing message through the Internet link to the second PSTN in Internet data packet protocol format in which data packets each contain a header portion and a message data content portion data identifying the calling subscriber line being contained in the message data content portion of an Internet data packet, extracting the data identifying the calling subscriber line from the message data content portion of the Internet data packet at a switching system in said second PSTN, and sending said calling subscriber line information obtained in the extracting step to the called subscriber line while routing the call.

10. A method as recited in claim 9, wherein said sending step occurs while the called subscriber line is in an on-hook state, whereby a party at the called station may identify the calling party before answering the call.

11. A method as recited in claim 9, further comprising the step of storing said extracted information in said switching system if said call is terminated without being answered at said called station.

12. A method as recited in claim 11, further comprising the step of automatically placing by said switching system, after termination of said call, a second call from said called subscriber line to said calling subscriber line in response to entry of a predefined code at said called station.

13. A method as recited in claim 11, further comprising the step of automatically sending said stored information from said switching system to said called subscriber line in response to entry of a predefined code at said called station after said call has been terminated, whereby a party at the called station may identify the calling party.

14. A method as recited in claim 9, wherein said Internet data packet protocol format is TCP/IP protocol.

15. A method as recited in claim 9, wherein said transporting step further comprises:

accessing a data base from a first gateway router that interfaces between the first PSTN and the Internet;

identifying from said data base a second gateway router that interfaces between the second PSTN and the Internet, whereby said call is to traverse the Internet between the first and second gateway routers; and transmitting the routines message to the second gateway router.

16. A method as recited in claim 15, wherein said transporting step comprises converting the TCP/IP protocol message to a common channel signaling protocol message by said second gateway router for receipt by said switching system.

17. A method as recited in claim 16, wherein the common channel signaling protocol message received by said switching system includes information identifying the calling subscriber line and information identifying said second gateway router and said extracting step comprises distinguishing caller subscriber line identification from gateway router identification.

18. A method as recited in claim 15, wherein the header portion of said Internet data packet contains data identifying the first and second gateway routers and said switching system is connected to the second gateway router by a dedicated connection, and said extracting step comprises:

converting at the second gateway routers the TCP/IP protocol routing message to a common channel signaling protocol routing message with a caller identifier field having data indicating said second gateway router;

receiving the routing message converted in said converting step at said switching system via said dedicated connection; and in response to recognition at said switching system that the routing message was received from said dedicated connection, obtaining calling subscriber line information from routing message data other than the routing message caller identifier field.

\* \* \* \* \*